(12) United States Patent
Nair et al.

(10) Patent No.: US 12,491,641 B2
(45) Date of Patent: Dec. 9, 2025

(54) SYSTEM AND METHOD FOR AUTOMATICALLY CORRECTING ORIENTATION OF MOBILE ROBOT

(71) Applicant: Addverb Technologies Limited, Noida (IN)

(72) Inventors: Devnath Nair, Kottayam (IN); Sunil Sulania, Alwar (IN)

(73) Assignee: Addverb Technologies Limited, Noida (IN)

( * ) Notice: Subject to any disclaimer, the term of this patent is extended or adjusted under 35 U.S.C. 154(b) by 215 days.

(21) Appl. No.: 18/105,488

(22) Filed: Feb. 3, 2023

(65) Prior Publication Data

US 2023/0256613 A1    Aug. 17, 2023

(30) Foreign Application Priority Data

Feb. 11, 2022  (IN) .............................. 202211007476

(51) Int. Cl.
    *B25J 9/16*    (2006.01)
(52) U.S. Cl.
    CPC ............ *B25J 9/1697* (2013.01); *B25J 9/1664* (2013.01); *B25J 9/1692* (2013.01)
(58) Field of Classification Search
    CPC ....... B25J 9/1697; B25J 9/1664; B25J 9/1692
    See application file for complete search history.

(56) References Cited

U.S. PATENT DOCUMENTS

| | | | |
|---|---|---|---|
| 8,676,426 B1* | 3/2014 | Murphy | G05D 1/0265 |
| | | | 318/587 |
| 11,241,791 B1 | 2/2022 | Ebrahimi Afrouzi et al. | |
| 2011/0194755 A1* | 8/2011 | Jeong | G06T 7/77 |
| | | | 901/1 |
| 2014/0342834 A1* | 11/2014 | Tappeiner | A63F 13/00 |
| | | | 463/42 |
| 2016/0091899 A1* | 3/2016 | Aldred | B25J 5/00 |
| | | | 901/1 |
| 2017/0113342 A1* | 4/2017 | Abramson | G05D 1/2244 |
| 2018/0161984 A1* | 6/2018 | Ishige | B25J 9/1697 |
| 2019/0072975 A1* | 3/2019 | Choi | G05D 1/0246 |
| 2019/0086547 A1 | 3/2019 | Shaffer et al. | |
| 2020/0047330 A1* | 2/2020 | Lee | B25J 9/1664 |
| 2021/0180954 A1* | 6/2021 | Hiyokawa | G06V 20/586 |
| 2021/0229273 A1* | 7/2021 | Kanai | B25J 9/162 |
| 2022/0081216 A1* | 3/2022 | Johnson | B25J 9/1653 |

\* cited by examiner

*Primary Examiner* — Mohamad O El Sayah
(74) *Attorney, Agent, or Firm* — Bradley Arant Boult Cummings LLP

(57) ABSTRACT

A system and method for automatically correcting orientation of a mobile robot operating in a work area comprising a matrix of ground markers is provided. The system comprises a pattern formed in each of defined grids in the work area. The pattern defines a plurality of vectors converging towards the corresponding ground marker positioned in the respective defined grid. The system further comprises a processing unit configured to: receive the captured image from an optical recognizer provided in the mobile robot; process the captured image to check if any section of the pattern is visible therein and to determine any vector visible in the section of the pattern; and configure an odometry control arrangement of the mobile robot to reorient the mobile robot to follow a path in a direction of the determined one of the plurality of vectors.

9 Claims, 7 Drawing Sheets

SYSTEM AND METHOD FOR AUTOMATICALLY CORRECTING ORIENTATION OF MOBILE ROBOT

FIELD OF THE PRESENT DISCLOSURE

The present disclosure generally relates to autonomous guided vehicles, such as a mobile robot, implemented to move in a work area comprising a matrix of ground markers, and particularly to a system and method for automatically correcting orientation of a mobile robot operating in a work area comprising a matrix of ground markers.

BACKGROUND

Autonomous guided vehicles (AGVs), also known as mobile robots, are increasingly being employed for transporting goods and materials from one place to another in constrained environments, such as a factory or a warehouse. For example, mobile robots are used in warehouse environments to assist with inventory management by transporting goods from one area of the warehouse to another. In a warehouse, the mobile robot may travel from a loading area to a dropping area based on a control system and without intervention from users. In a manufacturing plant, the mobile robots can transport items such as heavy vehicle components like engines, chassis, etc. along a route on a floor of the manufacturing plant to deliver the payload from one location to another or to allow various manufacturing operations to be performed thereon. Mobile robots may offer the ability to carry payloads too heavy for a person to carry and without the supervision of a person, while also offering the flexibility to be reconfigured to follow a different route or carry different types of payloads.

Most systems involving such mobile robots implement ground markers placed on a floor, usually in the form of a matrix, to enable the mobile robots to follow a path defined using a combination of such ground markers. The mobile robot determines its position with respect to the floor based on the ground marker in vicinity (specifically, directly underneath) thereof. The very essence of the mobile robots is that its movements are accurately predetermined, so as to accurately follow the predefined path. However, due to operational wear, mechanical degradation, electrical degradation, temperature variation, etc., the estimated value of position error accumulates over operation of the mobile robots. This can cause the mobile robot to deviate from the predefined path during its operation. Traditionally, the mobile robot is brought back to the predefined path by moving it to the adjacent ground marker, but this process is usually manual which may be cumbersome and not cost-effective. Further, it may be noted that since unimpeded system operation highly depends upon mobile robot's availability, downtime or maintenance is undesirable and can incur high costs.

Therefore, in light of the foregoing discussion, there exists a need to overcome problems associated with conventional techniques and provide systems and/or methods for correcting orientation of a mobile robot operating in a work area which is fast and automated, and such that the mobile robot may itself find out if deviating from the predefined path and automatically correct its orientation, while minimally affecting system's throughput.

SUMMARY

In an aspect, a system for automatically correcting orientation of a mobile robot operating in a work area comprising a matrix of ground markers is provided. The system comprises an odometry control arrangement provided in the mobile robot. The odometry control arrangement is configured to control movement of the mobile robot in the work area based on the ground markers therein. The system also comprises an optical recognizer provided in the mobile robot. The optical recognizer is configured to capture an image of a portion of the work area underneath the mobile robot when the mobile robot is operating in the work area. The system also comprises a respective grid defined for one or more of the ground markers from the matrix of ground markers in the work area, with each of the defined grids having the corresponding ground marker positioned inside thereof. The system also comprises a pattern formed in each of the defined grids in the work area. The pattern defines a plurality of vectors converging towards the corresponding ground marker positioned in the respective defined grid. In particular, the plurality of vectors are extracted (calculates) from the pattern formed in each of the defined grids in the work area. The system further comprises a processing unit. The processing unit is configured to receive the captured image from the optical recognizer. The processing unit is further configured to process the captured image to check if at least a section of the pattern is visible therein. The processing unit is further configured to process the captured image to determine one of the plurality of vectors visible in the section of the pattern, if the section of the pattern is visible in the captured image. The processing unit is further configured to configure the odometry control arrangement to reorient the mobile robot to follow a path in a direction of the determined one of the plurality of vectors.

In one or more embodiments, each of the defined grids has a closed loop shape. The corresponding ground marker is positioned at a geometric centre of the closed loop shape of the respective defined grid.

In one or more embodiments, the pattern comprises a plurality of lines printed in the respective grid, with each of the plurality of lines having a respective first end located at one of a plurality of distant points disposed along each edge of the respective defined grid and a respective second end located at a centre of the corresponding ground marker positioned in the respective defined grid. Herein, each of the plurality of vectors defined in the pattern corresponds to one of the plurality of lines in a direction from the respective first end to the respective second end thereof.

In one or more embodiments, the pattern comprises a predefined shape repeatedly printed in the respective grid and connecting along a plurality of virtual lines, with each of the plurality of virtual lines having a respective first end located at one of a plurality of distant points disposed along each edge of the respective defined grid and a respective second end located at a centre of the corresponding ground marker positioned in the respective defined grid, and with a size of the predefined shapes being continuously decreasing along the corresponding virtual line. Herein, each of the plurality of vectors defined in the pattern corresponds to one of the plurality of virtual lines in a direction from the respective first end to the respective second end thereof.

In one or more embodiments, the pattern comprises a plurality of concentric circles printed in the respective grid, with the circles in the plurality of concentric circles having a decreasing diameter moving from each edge of the respective defined grid towards a centre of the corresponding ground marker positioned in the respective defined grid. Herein, each of the plurality of vectors defined in the pattern corresponds to a perpendicular bisector of segments of the two or more circles of the plurality of concentric circles that are visible in the section of the pattern.

In one or more embodiments, the processing unit is configured to implement a feature extraction technique to determine the one of the plurality of vectors.

In another aspect, a method for automatically correcting orientation of a mobile robot operating in a work area comprising a matrix of ground markers is provided. The method comprises defining a respective grid for one or more of the ground markers from the matrix of ground markers in the work area with each of the defined grids having the corresponding ground marker positioned inside thereof. The method also comprises providing a pattern in each of the defined grids in the work area, wherein the pattern defines a plurality of vectors converging towards the corresponding ground marker positioned in the respective grid. The method further comprises configuring an optical recognizer provided in the mobile robot to capture an image of a portion of the work area underneath the mobile robot when the mobile robot is operating in the work area. The method further comprises processing the captured image to check if at least a section of the pattern is visible therein. The method further comprises processing the captured image to determine one of the plurality of vectors visible in the section of the pattern, if the section of the pattern is visible in the captured image. The method further comprises configuring an odometry control arrangement to reorient the mobile robot to follow a path in a direction of the determined one of the plurality of vectors.

In one or more embodiments, defining the pattern comprises defining a plurality of lines printed in the respective grid, with each of the plurality of lines having a respective first end located at one of a plurality of distant points disposed along each edge of the respective defined grid and a respective second end located at a centre of the corresponding ground marker positioned in the respective defined grid. Herein, each of the plurality of vectors defined in the pattern corresponds to one of the plurality of lines in a direction from the respective first end to the respective second end thereof.

In one or more embodiments, defining the pattern comprises defining a predefined shape repeatedly printed in the respective grid and connecting along a plurality of virtual lines, with each of the plurality of virtual lines having a respective first end located at one of a plurality of distant points disposed along each edge of the respective defined grid and a respective second end located at a centre of the corresponding ground marker positioned in the respective defined grid, and with a size of the predefined shapes being continuously decreasing along the corresponding virtual line. Herein, each of the plurality of vectors defined in the pattern corresponds to one of the plurality of virtual lines in a direction from the respective first end to the respective second end thereof.

In one or more embodiments, defining the pattern comprises defining a plurality of concentric circles printed in the respective grid, with the circles in the plurality of concentric circles having a decreasing diameter moving from each edge of the respective defined grid towards a centre of the corresponding ground marker positioned in the respective defined grid. Herein, each of the plurality of vectors defined in the pattern corresponds to a perpendicular bisector of segments of the two or more circles of the plurality of concentric circles that are visible in the section of the pattern.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

For a more complete understanding of example embodiments of the present disclosure, reference is now made to the following descriptions taken in connection with the accompanying drawings in which.

DETAILED DESCRIPTION

Figure 1:
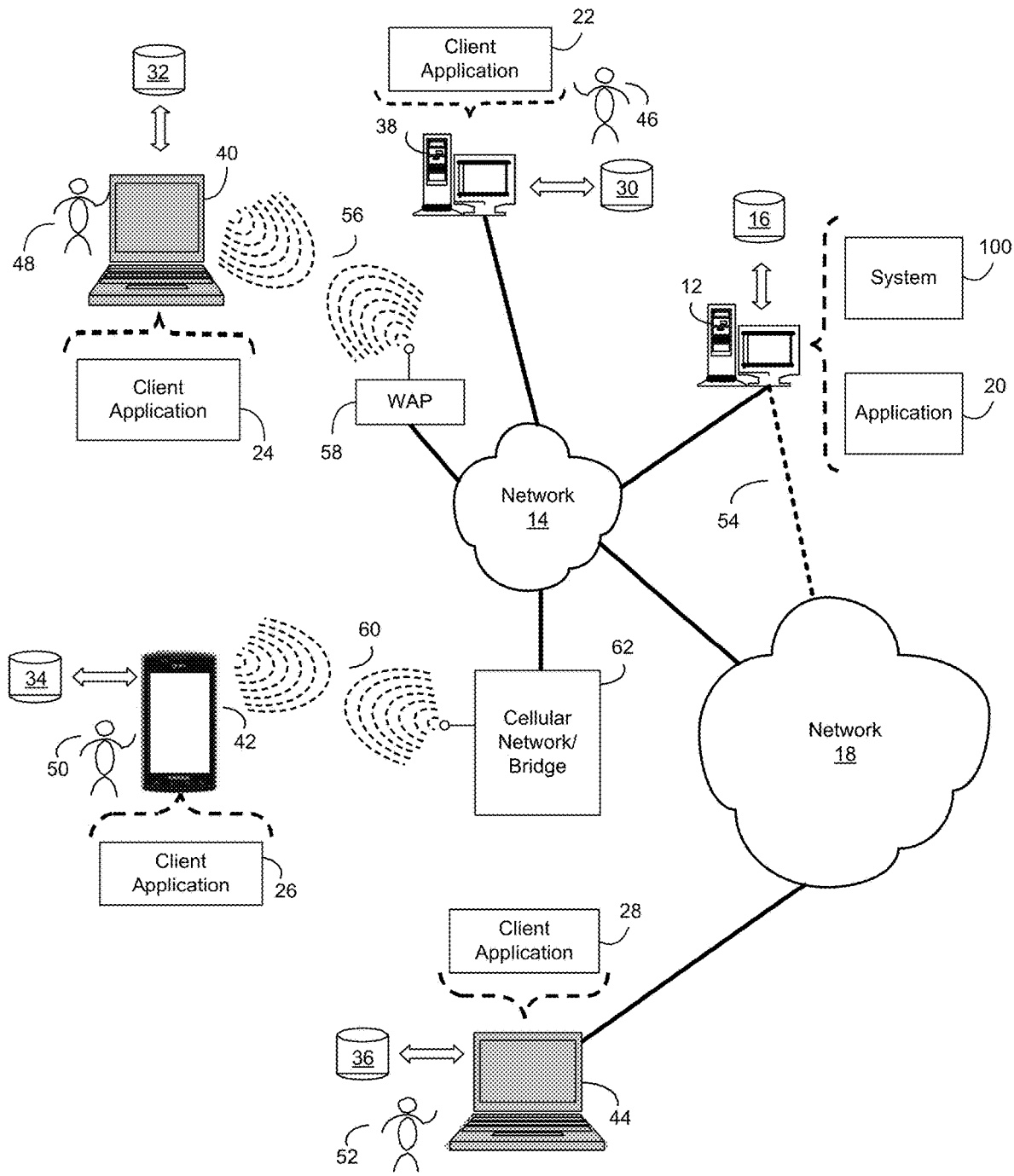
FIG. 1 illustrates a schematic of a system that may reside on and may be executed by a computer, which may be connected to a network, in accordance with one or more embodiments of the present disclosure.

In the following description, for purposes of explanation, numerous specific details are set forth in order to provide a thorough understanding of the present disclosure. It will be apparent, however, to one skilled in the art that the present disclosure is not limited to these specific details.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Some portions of the detailed description that follows are presented and discussed in terms of a process or method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fibre cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript, PERL, or Python. In present implementations, the used language for training may be one of Python, Tensorflow™ Bazel, C, C++. Further, decoder in user device (as will be discussed) may use C, C++ or any processor specific ISA. Furthermore, assembly code inside C/C++ may be utilized for specific operation. Also, ASR (automatic speech recognition) and G2P decoder along with entire user system can be run in embedded Linux (any distribution), Android, IOS, Windows, or the like, without any limitations. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general-purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown a system 100 that may reside on and may be executed by a computer (e.g., computer 12), which may be connected to a network (e.g., network 14) (e.g., the internet or a local area network). Examples of computer 12 may include, but are not limited to, a personal computer(s), a laptop computer(s), mobile computing device(s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, a portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, the instruction sets and subroutines of system 100, which may be stored on storage device, such as storage device 16, coupled to computer 12, may be executed by one or more processors (not shown) and one or more memory architectures included within computer 12. In some implementations, storage device 16 may include but is not limited to: a hard disk drive; a flash drive, a tape drive; an optical drive; a RAID array (or other array); a random-access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, system 100 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute application 20 for automatically correcting orientation of a mobile robot operating in a work area. In some implementations, system 100 and/or application 20 may be accessed via one or more of client applications 22, 24, 26, 28. In some implementations, system 100 may be a standalone application, or may be an applet/application/script/extension that may interact with and/or be executed within application 20, a component of application 20, and/or one or more of client applications 22, 24, 26, 28. In some implementations, application 20 may be a standalone application, or may be an applet/application/script/extension that may interact with and/or be executed within system 100, a component of system 100, and/or one or more of client applications 22, 24, 26, 28. In some implementations, one or more of client applications 22, 24, 26, 28 may be a standalone application, or may be an applet/application/script/extension that may interact with and/or be executed within and/or be a component of system 100 and/or application 20. Examples of client applications 22, 24, 26, 28 may include, but are not limited to, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to user devices 38, 40, 42, 44, may be executed by one or more processors and one or more memory architectures incorporated into user devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of user devices 38, 40, 42, 44 (and/or computer 12) may include, but are not limited to, a personal computer (e.g., user device 38), a laptop computer (e.g., user device 40), a smart/data-enabled, cellular phone (e.g., user device 42), a notebook computer (e.g., user device 44), a tablet (not shown), a server (not shown), a television (not shown), a smart television (not shown), a media (e.g., video, photo, etc.) capturing device (not shown), and a dedicated network device (not shown). User devices 38, 40, 42, 44 may each execute an operating system, examples of which may include but are not limited to, Android®, Apple® iOS®, Mac® OS X®; Red Hat® Linux®, or a custom operating system.

In some implementations, one or more of client applications 22, 24, 26, 28 may be configured to effectuate some or all of the functionality of system 100 (and vice versa). Accordingly, in some implementations, system 100 may be a purely server-side application, a purely client-side application, or a hybrid server-side/client-side application that is cooperatively executed by one or more of client applications 22, 24, 26, 28 and/or system 100.

In some implementations, one or more of client applications 22, 24, 26, 28 may be configured to effectuate some or all of the functionality of application 20 (and vice versa). Accordingly, in some implementations, application 20 may be a purely server-side application, a purely client-side application, or a hybrid server-side/client-side application that is cooperatively executed by one or more of client applications 22, 24, 26, 28 and/or application 20. As one or more of client applications 22, 24, 26, 28, system 100, and application 20, taken singly or in any combination, may effectuate some or all of the same functionality, any description of effectuating such functionality via one or more of client applications 22, 24, 26, 28, system 100, application 20, or combination thereof, and any described interaction(s) between one or more of client applications 22, 24, 26, 28, system 100, application 20, or combination thereof to effectuate such functionality, should be taken as an example only and not to limit the scope of the disclosure.

In some implementations, one or more of users 46, 48, 50, 52 may access computer 12 and system 100 (e.g., using one or more of user devices 38, 40, 42, 44) directly through network 14 or through secondary network 18. Further, computer 12 may be connected to network 14 through secondary network 18, as illustrated with phantom link line 54. System 100 may include one or more user interfaces, such as browsers and textual or graphical user interfaces, through which users 46, 48, 50, 52 may access system 100.

In some implementations, the various user devices may be directly or indirectly coupled to network 14 (or network 18). For example, user device 38 is shown directly coupled to network 14 via a hardwired network connection. Further, user device 44 is shown directly coupled to network 18 via a hardwired network connection. User device 40 is shown wirelessly coupled to network 14 via wireless communication channel 56 established between user device 40 and wireless access point (i.e., WAP) 58, which is shown directly coupled to network 14. WAP 58 may be, for example, an IEEE 802.11a, 802.11b, 802.11g, Wi-Fi®, RFID, and/or Bluetooth™ (including Bluetooth™ Low Energy) device that is capable of establishing wireless communication channel 56 between user device 40 and WAP 58. User device 42 is shown wirelessly coupled to network 14 via wireless communication channel 60 established between user device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example, Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
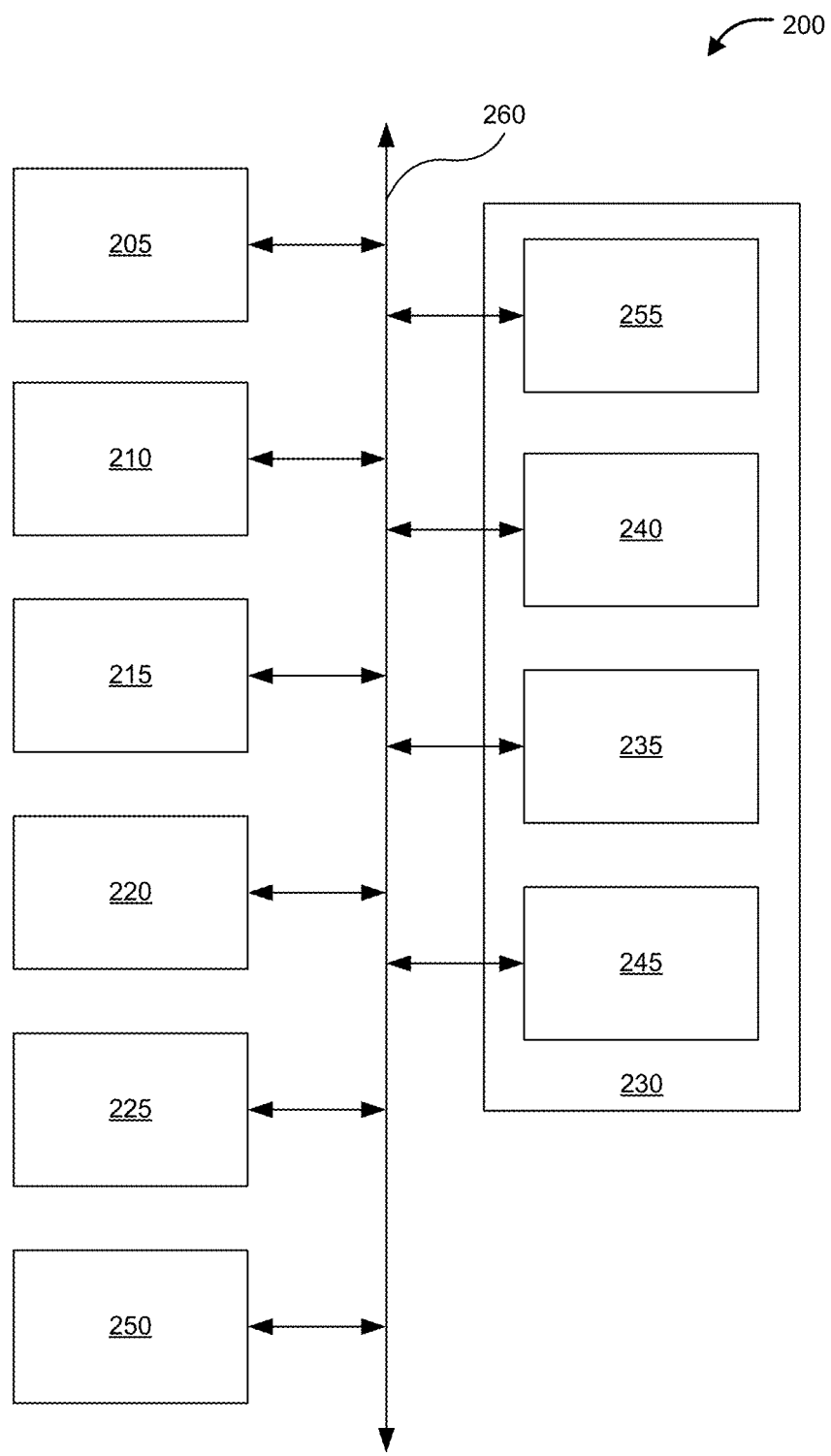
FIG. 2 illustrates a schematic of an exemplary computing system for automatically correcting orientation of a mobile robot operating in a work area, in accordance with one or more embodiments of the present disclosure.

For the purposes of the present disclosure, the system 100 may include a fleet management system. Herein, FIG. 2 is a block diagram of an example of a computing system representing the fleet management system 200 capable of implementing embodiments according to the present disclosure. The fleet management system 200 is implemented for issuing commands for managing and controlling operations of a fleet of mobile robots (as will be described later in more detail), which, in turn, may be utilized in a warehouse environment, a manufacturing plant and the like. In one embodiment, the application 20 for automatically calibrating odometry parameters of a mobile robot as described above may be executed as a part of the fleet management system 200 as described herein. Thereby, for example in case of a warehouse, the system 100 may be a broader system such as the warehouse management system (WMS) as known in the art, in which the fleet management system 200 may be executed for managing and controlling operations of a fleet of mobile robots. Hereinafter, the terms "system 100" and "fleet management system 200" have been broadly interchangeably used to represent means for managing and controlling operations of a fleet of mobile robots in a work environment, without any limitations.

In the example of FIG. 2, the fleet management system 200 includes a processing unit 205 for running software applications (such as, the application 20 of FIG. 1) and optionally an operating system. Memory 210 stores applications and data for use by the processing unit 205. Storage 215 provides non-volatile storage for applications and data and may include fixed disk drives, removable disk drives, flash memory devices, and CD-ROM, DVD-ROM or other optical storage devices. An optional user input device 220 includes devices that communicate user inputs from one or more users to the fleet management system 200 and may include keyboards, mice, joysticks, touch screens, etc. A communication or network interface 225 is provided which allows the fleet management system 200 to communicate with other computer systems via an electronic communications network, including wired and/or wireless communication and including an Intranet or the Internet. In one embodiment, the fleet management system 200 receives instructions and user inputs from a remote computer through communication interface 225. Communication interface 225 can comprise a transmitter and receiver for communicating with remote devices. An optional display device 250 may be provided which can be any device capable of displaying visual information in response to a signal from the fleet management system 200. The components of the fleet management system 200, including the processing unit 205, the memory 210, the data storage 215, the user input devices 220, the communication interface 225, and the display device 250, may be coupled via one or more data buses 260.

In the embodiment of FIG. 2, a graphics system 230 may be coupled with the data bus 260 and the components of the fleet management system 200. The graphics system 230 may include a physical graphics processing unit (GPU) 235 and graphics memory. The GPU 235 generates pixel data for output images from rendering commands. The physical GPU 235 can be configured as multiple virtual GPUs that may be used in parallel (concurrently) by a number of applications or processes executing in parallel. For example, mass scaling processes for rigid bodies or a variety of constraint solving processes may be run in parallel on the multiple virtual GPUs. Graphics memory may include a display memory 240 (e.g., a framebuffer) used for storing pixel data for each pixel of an output image. In another embodiment, the display memory 240 and/or additional memory 245 may be part of the memory 210 and may be shared with the processing unit 205. Alternatively, the display memory 240 and/or additional memory 245 can be one or more separate memories provided for the exclusive use of the graphics system 230. In another embodiment, graphics system 230 includes one or more additional physical GPUs 255, similar to the GPU 235. Each additional GPU 255 may be adapted to operate in parallel with the GPU 235. Each additional GPU 255 generates pixel data for output images from rendering commands. Each additional physical GPU 255 can be configured as multiple virtual GPUs that may be used in parallel (concurrently) by a number of applications or processes executing in parallel, e.g., processes that solve constraints. Each additional GPU 255 can operate in conjunction with the GPU 235, for example, to simultaneously generate pixel data for different portions of an output image, or to simultaneously generate pixel data for different output images. Each additional GPU 255 can be located on the same circuit board as the GPU 235, sharing a connection with the GPU 235 to the data bus 260, or each additional GPU 255 can be located on another circuit board separately coupled with the data bus 260. Each additional GPU 255 can also be integrated into the same module or chip package as the GPU 235. Each additional GPU 255 can have additional memory, similar to the display memory 240 and additional memory 245, or can share the memories 240 and 245 with the GPU 235. It is to be understood that the circuits and/or functionality of GPU as described herein could also be implemented in other types of processors, such as general-purpose or other special-purpose coprocessors, or within a CPU.

Figure 3:
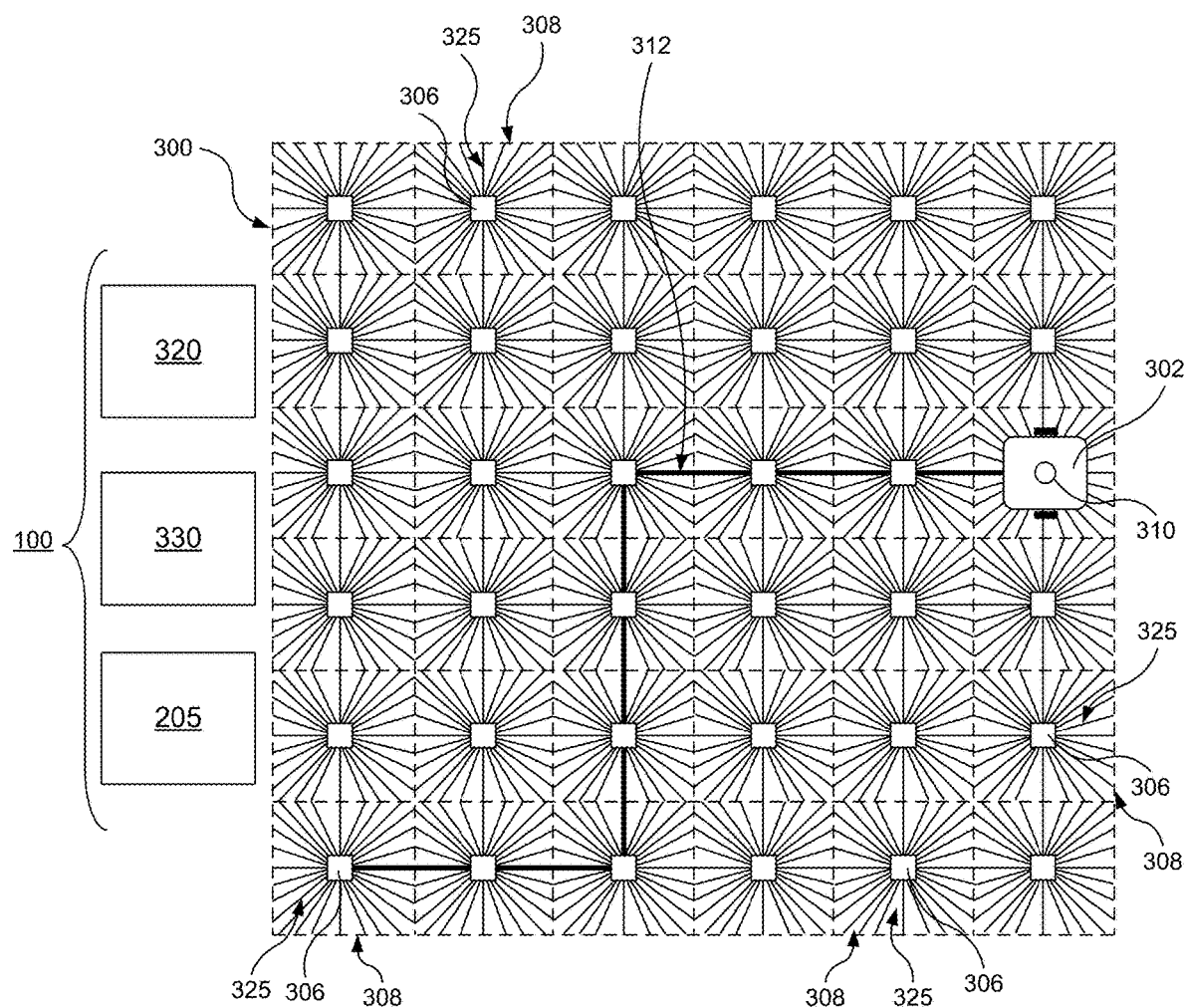
FIG. 3 illustrates a diagrammatic representation of the exemplary work area with respective grid defined for one or more of ground markers and a pattern formed in each of the defined grids therein, in accordance with one or more embodiments of the present disclosure.

Referring to FIG. 3, illustrated is an implementation of the system 100 for a work area 300 in which a fleet of mobile robots are operated, in accordance with one or more embodiments of the present disclosure. Herein, the work area 300 is shown to include the mobile robot 302. In the illustration of FIG. 3, one mobile robot has been shown and represented by numeral 302, although it may be appreciated that there may be multiple mobile robots 302, as part of the fleet of mobile robots, operating in the work area 300. Further, it may be appreciated that the work area 300 may be part of a larger floor space, e.g., in a warehouse environment (not shown) or the like. The mobile robot 302 may be utilized for various operations in the work area 300, like transferring of goods, such as cartons, in the work area 300, which is typical, e.g., for a warehouse environment. The mobile robot 302 may be configured to perform at least one operation in a cycle, which may involve the mobile robot 302 to travel from one position in the work area 300 to another, and this may be defined as an "operational cycle" of the mobile robot 302.

In the present embodiments, as shown in FIG. 3, the work area 300 includes a matrix of ground markers 306. In other words, the ground markers 306 are arranged in a manner to define a rectangular array of ground markers 306. Herein, the term "ground marker" is meant to include any number and all types of marks that serve the distinguishing function, either in isolation or combination. Such ground markers may include, but are not limited to, geometric shapes or characters that superficially and/or structurally alter the appearance of the work area 300, that may be easily recognized by compatible sensing means, which may be, in present examples, optical recognizers provided in the mobile robots 302 as discussed later. In the present illustration, the ground markers 306 are shown as regular sized squares; however, other shapes may be contemplated without any limitations.

Further, the system 100 comprises a respective grid 308 defined for one or more of the ground markers 306 from the matrix of ground markers 306 in the work area 300, with each of the defined grids 308 having the corresponding ground marker 306 positioned inside thereof. That is, as may be seen, the matrix of ground markers 306 virtually divides the work area 300 into the plurality of grids 308. Herein, each such grid 308 may, generally, be equal in area and may further, generally, have the same size as the mobile robot 302. In an embodiment, each of the defined grids 308 has a closed loop shape. In one example, the closed loop shape is a square shape for the defined grid 308. Further, the corresponding ground marker 306 is positioned at a geometric centre (not labelled) of the closed loop shape of the respective defined grid 308. Herein, for example, in case of the closed loop shape of the respective defined grid 308 being the square shape, the geometric centre would be a diagonal centre of the square shape of the respective defined grid 308. It may be appreciated that each of the defined grids 308 may have other polygonal shapes which may provide a centre at which the respective ground marker 306 may be placed, including rectangular, hexagonal, octagonal or the like without departing from the spirit and the scope of the present disclosure.

In the present examples, the mobile robot 302 may include an optical recognizer 310 (generally represented in FIG. 3). Such optical recognizer 310 may be provided in the mobile robot 302. In the present embodiments, the optical recognizer 310 is configured to capture an image of a portion of the work area 300 underneath the mobile robot 302 when the mobile robot 302 is operating in the work area. The optical recognizer 310 may be configured to recognize presence of the ground markers 306, specifically the ground marker 306 underneath the corresponding mobile robot 302 based on the captured image. In the present example, the optical recognizer 310 may be in the form of, but not limited to, a camera (or generally any optical arrangement) provided in a body of the mobile robot 302 and pointed to a floor of the work area 300 and/or a scanner configured to distinguish colours when the ground markers, including the ground markers 306, may be of a substantially different from the floor of the work area 300, or the like. Such optical recognizer 310 may be contemplated by a person skilled in the art and thus has not been described in any more detail herein for the brevity of the present disclosure. Herein, a sensitivity of the optical recognizer 310 may be dependent on a field-of-view (FoV) of the optical recognizer 310, including horizontal FoV as well as vertical horizontal FoV therefor. Herein, larger the sensitivity of the optical recognizer 310, higher the density of the ground markers 306 in the work area 300 could be used. Further, the geometric area of the ground markers 306 may be fixed based on the sensitivity of the optical recognizer 310, i.e., smaller the geometric area of the ground markers 306 that may be recognized by the optical recognizer 310, higher the density of the ground markers 306 in the matrix of second ground markers 306 in the work area 300 could be used.

In general, the optical recognizer 310 is configured to estimate a position of the mobile robot 302 with respect to one of the ground markers 306, from the matrix of ground markers 306, in vicinity thereof when the mobile robot 302 is moved using the odometry control arrangement (as discussed later) during the operational cycle thereof. In other words, the optical recognizer 310 may determine a relative position of the mobile robot 302 with respect to the ground marker 306 in vicinity thereof. Herein, by the term "the ground marker 306 in vicinity thereof" means the ground marker 306 from which the mobile robot 302 may have started to be moved to the next ground marker 306 as per the predefined path 312, or the next ground marker 306 to which the mobile robot 302 is supposed to reach as per the predefined path 312. As discussed, the optical recognizer 310 is provided in the mobile robot 302. That is, the optical recognizer 310 may be configured to monitor movement of the mobile robot 302 to estimate the position of the mobile robot 302 relative to its starting location in the work area 300. The optical recognizer 310 may recognize the ground markers 306, and by keeping count of the number of such recognized ground markers 306 and known change in directions as per the predefined path 312, the processing unit 205 may use the recognized ground markers 306 to estimate the position of the mobile robot 302 relative to its starting location in the work area 300.

In some examples, the mobile robot 302, being the wheel-driven mobile robot 302, may also include one or more of wheel encoders, an odometer, an inertial measurement unit (IMU) for determining its position in the work area 300. In an example, the wheel encoders (not shown) may be associated with one or more of its drive wheels, and such wheel encoders may determine the distance travelled by the mobile robot 302 and thereby the estimate the position of the mobile robot 302 relative to its starting location in the work area 300. In another example, the odometer (not shown) associated with the mobile robot 302 (or specifically, the drive wheels of the mobile robot 302) may perform the same function to estimate the position of the mobile robot 302 relative to its starting location in the work area 300. In still other example, the inertial measurement unit (IMU) (not shown) associated with the mobile robot 302 may also perform the same function (as may be contemplated by a person skilled in the art) to estimate the position of the mobile robot 302 relative to its starting location in the work area 300.

Herein, the system 100 may define a path, i.e., a predefined path (such as, an exemplary predefined path 312 as shown in FIG. 3) to be followed by the mobile robot 302 in the work area 300. The predefined path 312 may be defined by virtually linking multiple ground markers 306 (as a virtual track), in various possible combinations, for the mobile robot 302 to travel thereon. Typically, the predefined path 312 as provided by the system 100 is a navigation path including a set of straight lines passing through centres of the ground markers 306, in the matrix of ground markers 306 in the work area 300. Such arrangement using the ground markers may be contemplated by a person skilled in the art and thus has not been described further for the brevity of the present disclosure.

The system 100 includes an odometry control arrangement 320 (as schematically shown in FIG. 3). The odometry control arrangement 320 is provided in the mobile robot 302. Herein, "odometry" refers to the use of data from motion sensors to estimate change in position over time. In the present mobile robot 302, the odometry control arrangement 320 is configured to estimate a position of the mobile robot 302 relative to a starting location. By estimating such position, as may be contemplated, the odometry control arrangement 320 may be implemented to control movements of the mobile robot 302 in the work area 300, such that the mobile robot 302 may be able to follow the predefined path 312 (as discussed earlier). In the present embodiments, the odometry control arrangement 320 is configured to control movement of the mobile robot 302 in the work area 300 based on the ground markers 306 positioned (laid out) therein. Specifically, the odometry control arrangement 320 in the mobile robot 302 may enable the mobile robot 302 to move (change its position) in the work area 300 from a current ground marker 306 to a next ground marker 306, and thereby follow the predefined path 312 as provided by the system 100.

It may be appreciated that the odometry control arrangement 320 may be in the form of a controller which may be any processing device, system or part thereof that controls at least one operation of the device. Such controller may be implemented in hardware, firmware or software, or some combination of at least two of the same. It should be noted that the functionality associated with any particular controller may be centralized or distributed, whether locally or remotely. Such controller may be a multi-core processor, a single core processor, or a combination of one or more multi-core processors and one or more single core processors. For example, the one or more processors may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. Further, the memory may include one or more non-transitory computer-readable storage media that can be read or accessed by other components in the device. The memory may be any computer-readable storage media, including volatile and/or non-volatile storage components, such as optical, magnetic, organic or other memory or disc storage, which can be integrated in whole or in part with the device. In some examples, the memory may be implemented using a single physical device (e.g., optical, magnetic, organic or other memory or disc storage unit), while in other embodiments, the memory may be implemented using two or more physical devices without any limitations.

As discussed, most systems involving the mobile robots (such as the mobile robot 302) requires that the movements of the mobile robot are accurate in the work area (such as the work area 300) for its proper operation. That is, the mobile robot may need to accurately follow the predefined path using the ground markers. However, due to operational wear, mechanical degradation, electrical degradation, temperature variation, etc., the mobile robot may accumulate position error over its various operation cycles. This can cause the mobile robot to deviate from the predefined path during its operation or have a certain bias while following the predefined path. Therefore, the mobile robot needs to be reoriented over its operational cycle for correcting these variations, such that the mobile robot could accurately follow the predefined path so as to achieve the defined purpose therefor.

According to embodiments of the present disclosure, as illustrated in FIG. 3, the system 100 further comprises a pattern 325 formed in each of the defined grids 308 in the work area 300. In the illustration of FIG. 3, each of the grids 308 in the work area 300 has been shown to include the pattern 325. However, in other examples, only some of the grids 308 may include the pattern 325 without any limitations. The pattern 325 may be defined in some of the grids 308, with such grids 308 being selected randomly or based on some predefined scheme without any limitations. Such predefined scheme may be based on the grids 308 (that is, section of the work area 300) in which the mobile robot 302 may likely have a chance of getting disoriented. Such grids 308 may be identified based on monitoring of the mobile robots 302 in the work area 300 over a period of time. In one or more embodiments, the pattern 325 may cover the entire corresponding grid 308. That is, the pattern 325 may be defined in the entire area of the corresponding grid 308. In some examples, the pattern 325 may only partially cover the corresponding grid 308. In such case, the pattern 325 may be formed closer to the centre of the corresponding grid 308, at least extending beyond the geometric area of the corresponding ground marker 306 placed therein. In some embodiments, two or more types of different patterns 325 (as described later) may be used in combination in the work area 300 without any limitations. Other such configurations for defining the pattern 325 in the corresponding grid 308 may be possible, and as such shall be contemplated to be covered in the present disclosure.

In the present embodiments, the pattern 325 defines a plurality of vectors (not labelled) converging towards the corresponding ground marker 306 positioned in the respective defined grid 308. The vectors may be defined as such in the pattern 325, that each vector may generally be pointed to the centre of the respective grid 308 with the corresponding pattern 325 defined therein. With the ground marker 306 being placed, typically, at the centre of the grid 308, the said vectors may thus generally be pointing towards or specifically converging to the said geometric centre of the corresponding ground marker 306. It may be appreciated that since the ground marker 306 may be occupying at least some of the area at the centre of the respective grid 308, the vectors as defined may not be actually leading to the centre of the grid 308 but may be ending at edges of the corresponding ground marker 306, but may still be considered to be converging to the centre of the respective grid 308 with the corresponding pattern 325 defined therein.

Figure 4:
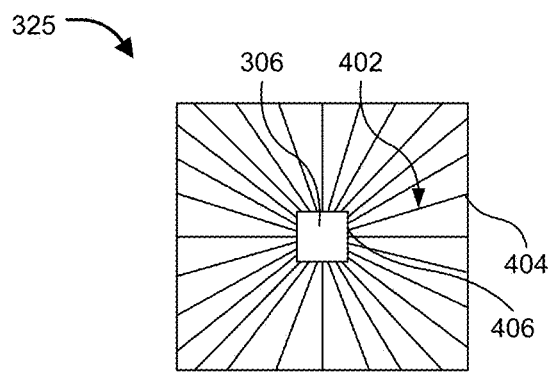
FIGS. 4-7 illustrate diagrammatic representations of different types of patterns formed in the defined grids in the work area, in accordance with one or more embodiments of the present disclosure.

FIGS. 4-7 illustrate diagrammatic representations of different types of patterns formed in the defined grids in the work area, in accordance with one or more embodiments of the present disclosure. In an embodiment, as illustrated in FIG. 4, the pattern 325 comprises a plurality of lines 402 printed in the respective grid 308, with each of the plurality of lines 402 having a respective first end 404 located at one of a plurality of distant points disposed along each edge of the respective defined grid 308 and a respective second end 406 located at a centre of the corresponding ground marker 306 positioned in the respective defined grid 308. Herein, in an example, the distant points may be equidistant points disposed along each edge of the respective defined grid 308. Further, the lines 402 may not be extending all the way to the centre (geometric centre) of the corresponding ground marker 306 and may be ending at the edges of the corresponding ground marker 306; and thus, the second end 406 of the lines 402 being like a virtual second end as being shown in FIG. 4. In the present embodiment, each of the plurality of vectors defined in the pattern 325 corresponds to one of the plurality of lines 402 in a direction from the respective first end 404 to the respective second end 406 thereof. That is, the vectors defined in the pattern 325 maps to the lines 402 converging towards the centre of the grid 308.

Figure 5:
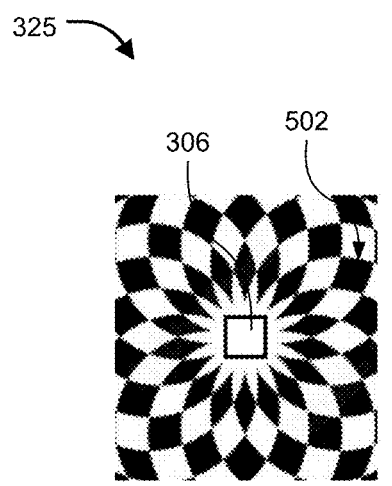
Figure 6:
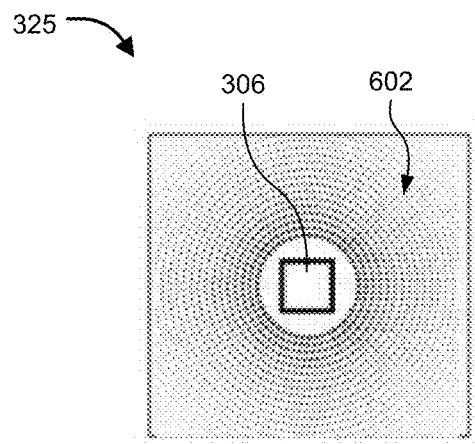

In an embodiment, as illustrated in FIGS. 5-6, the pattern 325 comprises a predefined shape 502, 602 repeatedly printed in the respective grid 308 and connecting along a plurality of virtual lines (not shown), with each of the plurality of virtual lines having a respective first end located at one of a plurality of distant points disposed along each edge of the respective defined grid 308 and a respective second end located at a centre of the corresponding ground marker 306 positioned in the respective defined grid 308. Herein, the predefined shape 502, 602 may be any suitable shape. For instance, in FIG. 5, the predefined shape 502 is in the form of diamonds. Alternatively, in FIG. 6, the predefined shape 602 is in the form of dots. Also, in the present embodiment, a size of the predefined shapes 502, 602 is continuously decreasing along the corresponding virtual line. Further, in the present embodiment, each of the plurality of vectors defined in the pattern 325 corresponds to one of the plurality of virtual lines in a direction from the respective first end to the respective second end thereof. That is, the vectors defined in the pattern 325 maps to the virtual lines defined by the corresponding predefined shape 502, 602 converging towards the centre of the grid 308.

Figure 7:
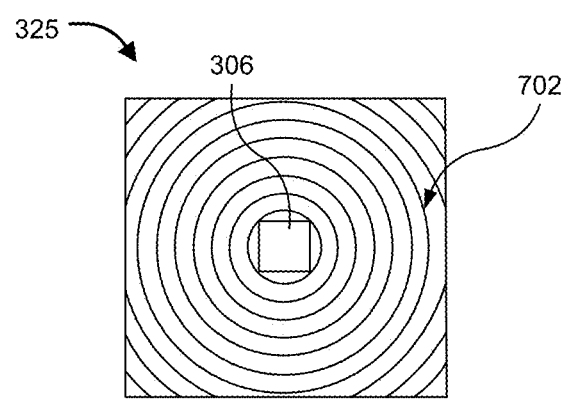

In an embodiment, as illustrated in FIG. 7, the pattern 325 comprises a plurality of concentric circles 702 printed in the respective grid 308. Herein, the circles 702 in the plurality of concentric circles 702 have a decreasing diameter moving from each edge of the respective defined grid 308 towards a centre of the corresponding ground marker 306 positioned in the respective defined grid 308. In the present embodiment, each of the plurality of vectors defined in the pattern 325 corresponds to a perpendicular bisector of segments of the two or more circles 702 of the plurality of concentric circles 702 that are visible in the section of the pattern 325. That is, in the section of the pattern 325, if segments of two or more circles 702 of the plurality of concentric circles 702 are visible, then the said vector is defined along the perpendicular bisector of segments of the said two or more circles 702.

The processing unit 205, in the system 100, is configured to determine an odometry error in the movement of the mobile robot 302 in the work area 300 based on the estimated position of the mobile robot 302 with respect to one of the ground markers 306. Herein, the term "odometry error" represents a navigation error in the mobile robot 302 in the work area 300. As discussed, the predefined path 312 as provided by the system 100 is a navigation path including a set of straight lines passing through centres of the ground markers 306, in the matrix of ground markers 306 in the work area 300. Such navigation error may occur when the mobile robot 302 may deviate from such straight lines (e.g., missing the centres of the ground markers 306) while supposedly following the predefined path 312 during the operational cycle thereof. In an example implementation, the processing unit 205 of the system 100 performs the necessary computation and calculations (as described in the proceeding paragraphs) required for confirming the odometry error in the movement of the mobile robot 302 as per embodiments of the present disclosure.

Figure 8:
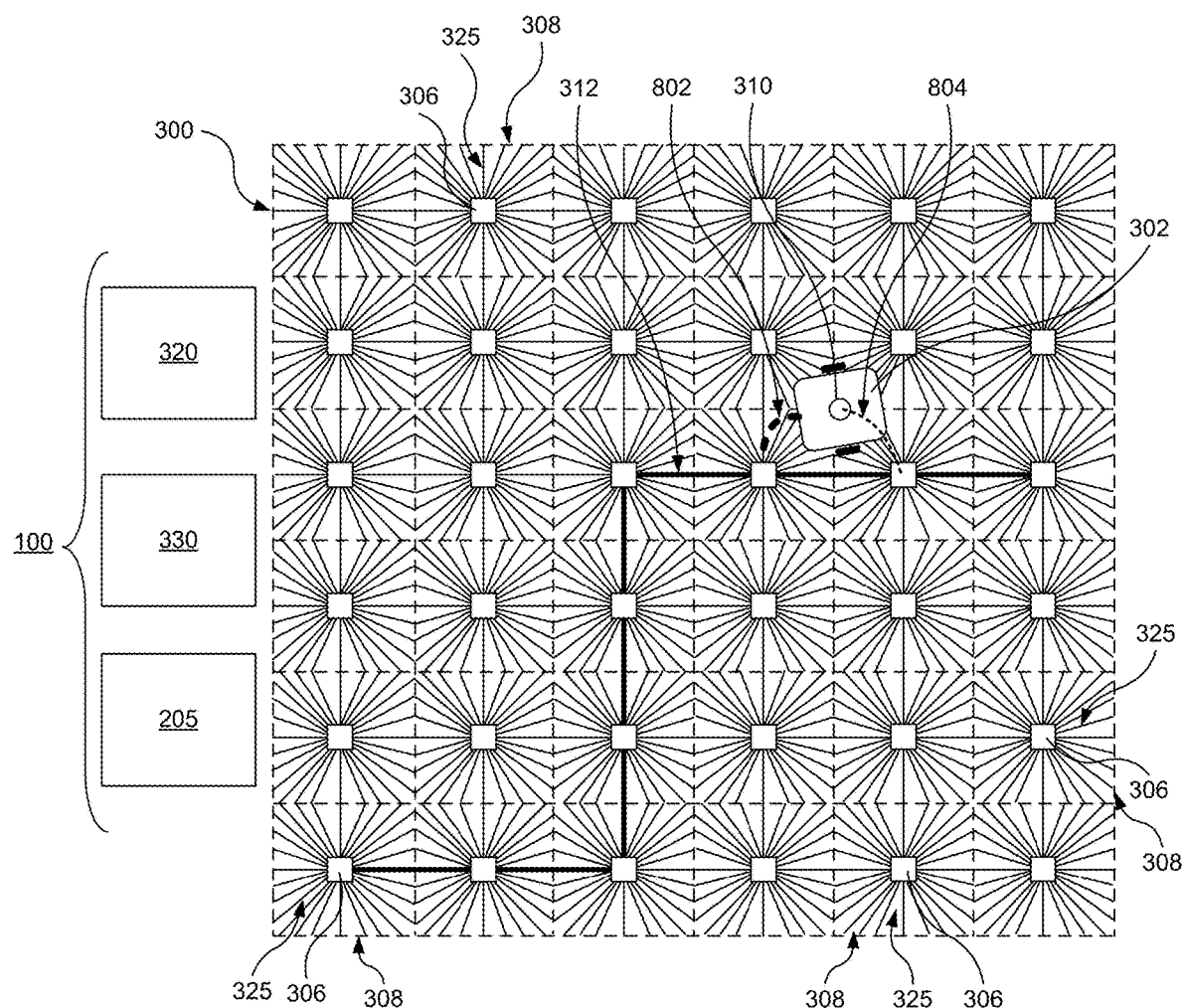
FIG. 8 illustrates a diagrammatic representation of exemplary implementation of the system for the work area in which a mobile robot has its orientation being automatically corrected using the patterns in the defined grids therein, in accordance with one or more embodiments of the present disclosure.

FIG. 8 illustrates a diagrammatic representation of exemplary implementation of the system 100 for the work area 300 in which the mobile robot 302 has its orientation being automatically corrected using the patterns 325 in the defined grids 308 therein. As may be seen, the mobile robot 302 has deviated from its predefined path 312 as represented by a section 802 which would be a part of its actual deviated path. Specifically, in the present embodiments, the patterns 325 are used to allow for automatically correcting orientation of the mobile robot 302 operating in the work area 300, as discussed later in more detail. Further, as may be seen, the system 100 of the present disclosure reorients the mobile robot 302 by moving it along a section 804 to bring the robot vehicle 302 back to its predefined path 312. The steps for achieving the same have been described in detail in the proceeding paragraphs.

According to embodiments of the present disclosure, the processing unit 205 is configured to receive the captured image from the optical recognizer 310. The processing unit 205 is configured to process the captured image to check if the ground marker 306 is visible therein. If YES, the mobile robot 302 may perform the operation as per the typical process known in the art. If NO, the processing unit 205 is further configured to process the captured image to check if at least a section of the pattern 325 is visible therein. In some embodiments, the processing unit 205 further checks the captured image to check that the ground marker 306 is not visible therein. In the present embodiments, the processing unit 205 may perform such steps to determine/confirm the odometry error in the mobile robot 302. It may be appreciated that such analysis may be carried out by the processing unit 205 using known suitable image processing techniques, including ones using machine learning models trained on images of the ground markers 306 and/or the pattern 325 (or sections of pattern 325). Such image processing techniques may be contemplated by a person skilled in the art and thus nor described herein for the brevity of the present disclosure. Now, as may be understood by a person skilled in the art that, herein, if the section of the pattern 325 is visible in the captured image, then it may be determined by the processing unit 205 that there may be some odometry error in the mobile robot 302. Additionally, or alternatively, if none of the ground markers 306 is visible in the captured image, then it may be determined by the processing unit 205 that there may be some odometry error in the mobile robot 302. This may be so since the mobile robot 302 would have deviated from the predefined path 312 (as defined using the ground markers 306); because if the predefined path 312 may have been accurately followed, any section of pattern 325 should not have been visible or at least a section of the ground marker 306 should have been visible. This way the processing unit 205 may determine that whether the mobile robot 302 may have deviated from the predefined path 312 and thus the orientation of the mobile robot 302 may need to be corrected, so as to bring the mobile robot 302 back to the originally provided predefined path 312 for performing the designated operation/function by the present system 100.

In some embodiments, the processing unit 205 may further be configured to determine the odometry error based on one or more of: a cross track error, a number of missed ground markers and an average of goal reaching tolerances, based on the estimated position of the mobile robot 302 with respect to one of the ground markers 306 during the operational cycle thereof, to determine the odometry error. In an example, the odometry error in the movement of the mobile robot 302 may be determined based on lateral error (cross track error) which is the distance between the geometric centre of the optical recognizer 310 on the mobile robot 302 and the closest point on the predefined path 312. Lateral error is the principal measure of how close the position of the mobile robot 302 is to the desired position along the predefined path 312. In an example, the odometry error may be determined based on a number of emergency stop incidents of the mobile robot 302 during the operational cycle. Such emergency stop incidents of the mobile robot 302 may occur when the mobile robot 302 would stop or would have to be stopped (either manually or automatically by the system 100) due to improper functioning of the odometry control arrangement 320 therein. In an example, the odometry error may be determined based on an average goal reaching error of the mobile robot 302. Herein, the average goal reaching error may include longitudinal error which is defined as a difference between the centre of the ground marker 306 and the centre of the optical recognizer 310 along a direction of movement of the mobile robot 302, and an orientation error which is defined as the angular difference between the heading of the mobile robot 302 (in the direction of movement) and the ground marker 306. In an example, the odometry error may be determined based on a number of missed ground markers by the mobile robot 302 during its operational cycle while supposedly following the predefined path 312. As during conventional operation, the ground marker 306 is to be detected at a fixed/variable set of distances, and if the ground marker 306 is not detected (e.g., by the marker recogniser 310) at the said fixed/variable distance (or the ground marker count threshold) during the operational cycle in the work area 300, the incident is counted as a missed ground marker.

It may be appreciated that the odometry error in the mobile robot 302 may generally be determined based on the estimated position of the mobile robot 302 with respect to one of the ground markers 306. The different errors are recorded and quantified by the processing unit 205 to determine an average/rolling values of such errors in isolation or combination during the operational cycle of the mobile robot 302, and if such average exceeds a predetermined threshold, the processing unit 205 may confirm the odometry error in the movement of the mobile robot 302 in the work area 300. Further, as discussed, the mobile robot's odometry needs to be corrected by reorienting the mobile robot 302 during its operational cycle for correcting the odometry error. In an example, the processing unit 205 may first check if the determined odometry error is greater than a predetermined threshold, and only then may confirm that the orientation of the mobile robot 302 needs to be corrected.

For the purpose of the present disclosure as discussed in the preceding paragraph, the processing unit 205 is configured to process the captured image to determine one of the plurality of vectors visible in the section of the pattern 325, if the section of the pattern 325 is visible in the captured image. That is, the processing unit 205 may determine the vector that may be deduced from the section of the pattern 325 which is visible in the captured image. Such vector may be determined based on the type of the pattern 325 being implemented, with techniques as described above. For example, for the pattern 325 of FIG. 4, the vector defined in the visible section of the pattern 325 is determined to be mapping to one of the lines 402 in the middle of the said section of the pattern 325 converging towards the centre of the grid 308. For the different patterns 325 of FIGS. 5-7, the vector defined in the visible section of the pattern 325 is determined to be mapping to one of the virtual lines defined by the corresponding predefined shape 502, 602, 702 in the middle of the said section of the pattern 325 converging towards the centre of the grid 308. For the pattern 325 of FIG. 8, the vector defined in the visible section of the pattern 325 is determined to be along the perpendicular bisector of segments of the said two or more circles 802 in the middle of the said section of the pattern 325. In an embodiment, the processing unit 205 is configured to implement a feature extraction technique to determine the one of the plurality of vectors. In an example, such feature extraction technique may be Hough Line Transform as known in the art. Alternatively, other feature extraction techniques such as, but not limited to, Prewitt & Sobel edge detection, Canny edge detection and like may be implemented without departing from the scope of the present disclosure.

The processing unit 205 is further configured to configure the odometry control arrangement 320 to reorient the mobile robot 302 to follow a path in a direction of the determined one of the plurality of vectors. That is, the odometry control arrangement 320 is configured to follow the path (generally along the section 804 as shown in FIG. 8) as defined by the determined vector to bring the mobile robot 302 back to the ground marker 306 in vicinity thereof, with that ground marker 306 usually being part of the predefined path 312 as provided by the system 100. This is achieved by reorienting the mobile robot 302 to deviate from the deviated path and move towards the said ground marker 306. Once the mobile robot 302 reaches the said ground marker 306, the mobile robot 302 can continue to follow the predefined path 312, In some cases, the mobile robot 302 may need to be oriented further when placed over the said ground marker 306 to be able to follow the predefined path 312 which may be achieved using conventional mobile robot navigation techniques.

This way the mobile robot 302 can automatically correct its orientation if deviated from the predefined path 312, to be able to get back to following the predefined path 312 and perform the necessary designated functions in the work area 300. That is, the processing unit 205 is further configured to instruct the mobile robot 302 to move in the work area 300 after correction of orientation by the odometry control arrangement 320, to perform regular operations thereof. With the odometry control arrangement 320 of the mobile robot 302 now being corrected, the mobile robot 302 may be able to precisely follow the predefined path 312 therefor (as provided by the system 100) during the operational cycle thereof, and thereby resulting in (contributing to) even more efficient operation of the present system 100.

Figure 9:
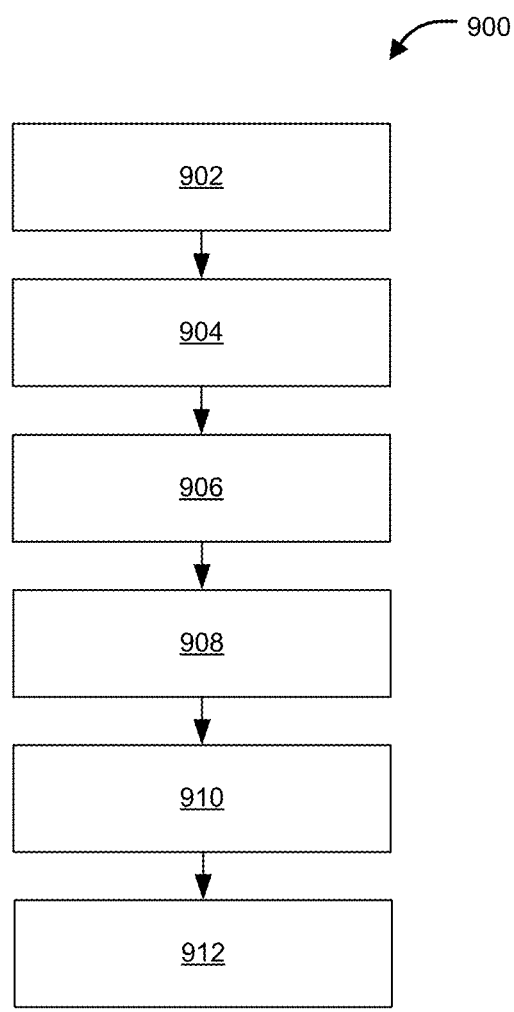
FIG. 9 illustrates a flowchart listing steps involved in a method for automatically correcting orientation of the mobile robot operating in a work area, in accordance with one or more embodiments of the present disclosure.

The present disclosure further provides a method for automatically correcting orientation of a mobile robot operating in a work area comprising a matrix of ground markers. Various embodiments and variants disclosed above, with respect to the aforementioned system 100, apply mutatis mutandis to the present method. FIG. 9 is a flowchart 900 of a method for automatically correcting orientation of a mobile robot operating in a work area comprising a matrix of ground markers. The various steps involved in the present method have been depicted as blocks in the flowchart 900 of FIG. 9, and the details for the same have been provided hereinafter.

At step 902, the method includes defining a respective grid 308 for one or more of the ground markers 308 from the matrix of ground markers 306 in the work area 300 with each of the defined grids 308 having the corresponding ground marker 306 positioned inside thereof. That is, the matrix of ground markers 306 virtually divide the work area 300 into the plurality of grids 308. Herein, each such grid 308 may, generally, be equal in area and may further, generally, have the same size as the mobile robot 302. In an embodiment, each of the defined grids 308 has a square shape. Further, the corresponding ground marker 306 is positioned at a centre (not labelled) of the square shape of the respective defined grid 308. Herein, the centre may be a diagonal centre of the square shape of the respective defined grid 308.

At step 904, the method includes providing a pattern 325 in each of the defined grids 308 in the work area 300, wherein the pattern 325 defines a plurality of vectors converging towards the corresponding ground marker 306 positioned in the respective grid 308. The vectors may be defined as such in the pattern 325, that each vector may generally be pointed to the centre of the respective grid 308 with the corresponding pattern 325 defined therein. With the ground marker 306 being placed, typically, at the centre of the grid 308, the said vectors may thus generally be pointing towards or specifically converging to the said geometric centre of the corresponding ground marker 306.

At step 906, the method includes configuring the optical recognizer 310 provided in the mobile robot 302 to capture an image of a portion of the work area 300 underneath the mobile robot 302 when the mobile robot 392 is operating in the work area 300. The optical recognizer 310 may be configured to recognize presence of the ground markers 306, specifically the ground marker 306 underneath the corresponding mobile robot 302 based on the captured image. In the present example, the optical recognizer 310 may be in the form of, but not limited to, a camera (or generally any optical arrangement) provided in a body of the mobile robot 302 and pointed to a floor of the work area 300 and/or a scanner configured to distinguish colours when the ground markers, including the ground markers 306, may be of a substantially different from the floor of the work area 300, or the like.

At step 908, the method includes processing the captured image to check if at least a section of the pattern 325 is visible therein. In some embodiments, the processing unit 205 further checks the captured image to check that the ground marker 306 is not visible therein. In the present embodiments, the processing unit 205 may perform such steps to determine/confirm the odometry error in the mobile robot 302. It may be appreciated that such analysis may be carried out by the processing unit 205 using known suitable image processing techniques, including ones using machine learning models trained on images of the ground markers 306 and/or the pattern 325 (or sections of pattern 325). Such image processing techniques may be contemplated by a person skilled in the art and thus nor described herein for the brevity of the present disclosure. Now, as may be understood by a person skilled in the art that, herein, if the section of the pattern 325 is visible in the captured image, then it may be determined by the processing unit 205 that there may be some odometry error in the mobile robot 302. Additionally, or alternatively, if none of the ground markers 306 is visible in the captured image, then it may be determined by the processing unit 205 that there may be some odometry error in the mobile robot 302. This may be so since the mobile robot 302 would have deviated from the predefined path 312 (as defined using the ground markers 306); because if the predefined path 312 may have been accurately followed, any section of pattern 325 should not have been visible or at least a section of the ground marker 306 should have been visible. This way the processing unit 205 may determine that whether the mobile robot 302 may have deviated from the predefined path 312 and thus the orientation of the mobile robot 302 may need to be corrected, so as to bring the mobile robot 302 back to the originally provided predefined path 312 for performing the designated operation/function by the present system 100.

At step 910, the method includes processing the captured image to determine one of the plurality of vectors visible in the section of the pattern 325, if the section of the pattern 325 is visible in the captured image. That is, the processing unit 205 may determine the vector that may be deduced from the section of the pattern 325 which is visible in the captured image. Such vector may be determined based on the type of the pattern 325 being implemented, with techniques as described above. For example, for the pattern 325 of FIG. 4, the vector defined in the visible section of the pattern 325 is determined to be mapping to one of the lines 402 in the middle of the said section of the pattern 325 converging towards the centre of the grid 308. For the different patterns 325 of FIGS. 5-6, the vector defined in the visible section of the pattern 325 is determined to be mapping to one of the virtual lines defined by the corresponding predefined shape 502, 602 in the middle of the said section of the pattern 325 converging towards the centre of the grid 308. For the pattern 325 of FIG. 7, the vector defined in the visible section of the pattern 325 is determined to be along the perpendicular bisector of segments of the said two or more circles 702 in the middle of the said section of the pattern 325. In an embodiment, the processing unit 205 is configured to implement a feature extraction technique to determine the one of the plurality of vectors. In an example, such feature extraction technique may be Hough Line Transform as known in the art. Alternatively, other feature extraction techniques such as, but not limited to, Prewitt & Sobel edge detection, Canny edge detection and like may be implemented without departing from the scope of the present disclosure.

At step 912, the method includes configuring the odometry control arrangement 320 to reorient the mobile robot 302 to follow a path in a direction of the determined one of the plurality of vectors. That is, the odometry control arrangement 320 is configured to follow the path (generally along the section 804 as shown in FIG. 8) as defined by the determined vector to bring the mobile robot 302 back to the ground marker 306 in vicinity thereof, with that ground marker 306 usually being part of the predefined path 312 as provided by the system 100. This is achieved by reorienting the mobile robot 302 to deviate from the deviated path and move towards the said ground marker 306. Once the mobile robot 302 reaches the said ground marker 306, the mobile robot 302 can continue to follow the predefined path 312, In some cases, the mobile robot 302 may need to be oriented further when placed over the said ground marker 306 to be able to follow the predefined path 312 which may be achieved using conventional mobile robot navigation techniques.

In an embodiment, in the present method, as illustrated in FIG. 4, defining the pattern 325 comprises defining a plurality of lines 402 printed in the respective grid 308, with each of the plurality of lines 402 having a respective first end 404 located at one of a plurality of distant points disposed along each edge of the respective defined grid 308 and a respective second end 406 located at a centre of the corresponding ground marker 306 positioned in the respective defined grid 308. Herein, in an example, the distant points may be equidistant points disposed along each edge of the respective defined grid 308. Further, the lines 402 may not be extending all the way to the centre (geometric centre) of the corresponding ground marker 306 and may be ending at the edges of the corresponding ground marker 306; and thus, the second end 406 of the lines 402 being like a virtual second end as being shown in FIG. 4. In the present embodiment, each of the plurality of vectors defined in the pattern 325 corresponds to one of the plurality of lines 402 in a direction from the respective first end 404 to the respective second end 406 thereof. That is, the vectors defined in the pattern 325 maps to the lines 402 converging towards the centre of the grid 308.

In an embodiment, in the present method, as illustrated in FIGS. 5-6, defining the pattern 325 comprises defining a predefined shape 502, 602 repeatedly printed in the respective grid 308 and connecting along a plurality of virtual lines (not shown), with each of the plurality of virtual lines having a respective first end located at one of a plurality of distant points disposed along each edge of the respective defined grid 308 and a respective second end located at a centre of the corresponding ground marker 306 positioned in the respective defined grid 308. Herein, the predefined shape 502, 602 may be any suitable shape. For instance, in FIG. 5, the predefined shape 502 is in the form of diamonds. Alternatively, in FIG. 6, the predefined shape 602 is in the form of dots. Also, in the present embodiment, a size of the predefined shapes 502, 602 is continuously decreasing along the corresponding virtual line. Further, in the present embodiment, each of the plurality of vectors defined in the pattern 325 corresponds to one of the plurality of virtual lines in a direction from the respective first end to the respective second end thereof. That is, the vectors defined in the pattern 325 maps to the virtual lines defined by the corresponding predefined shape 502, 602 converging towards the centre of the grid 308.

In an embodiment, in the present method, as illustrated in FIG. 7, defining the pattern 325 comprises defining a plurality of concentric circles 702 printed in the respective grid 308. Herein, the circles 702 in the plurality of concentric circles 702 have a decreasing diameter moving from each edge of the respective defined grid 308 towards a centre of the corresponding ground marker 306 positioned in the respective defined grid 308. In the present embodiment, each of the plurality of vectors defined in the pattern 325 corresponds to a perpendicular bisector of segments of the two or more circles 702 of the plurality of concentric circles 702 that are visible in the section of the pattern 325. That is, in the section of the pattern 325, if segments of two or more circles 702 of the plurality of concentric circles 702 are visible, then the said vector is defined along the perpendicular bisector of segments of the said two or more circles 702.

The system and the method of the present disclosure provide for automatically correcting orientation of a mobile robot operating in a work area comprising a matrix of ground markers. Herein, the mobile robots are commanded to undergo reorientation by the present system when it may be detected that the mobile robot may have deviated from the predefined path. The system and the method of the present disclosure utilizes the patterns printed in the grids corresponding to the ground markers for detecting deviation of the mobile robot from the predefined path, and further to reorient the mobile robot to bring it back to the predefined path. It may be appreciated that the mobile robots may already have means (like, the sensing arrangement) for providing information about exceptions, contingencies, recorded incidents, faults, runtimes (such as, max path deviation, average goal reach accuracy, total distance run etc.), which can help with determining its deviation from the predefined path, which can be used as supplementary to the techniques described in the present disclosure. The present disclosure addresses and corrects for the fact that systemic and non-systemic odometry errors can take place over the operational cycle for an autonomous robot, like the present mobile robot. The present disclosure provides that the odometry errors are corrected immediately without affecting the operational cycle of the mobile robot.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

The invention claimed is:

1. A system for automatically correcting orientation of a mobile robot operating in a work area comprising a matrix of ground markers, the system comprising:
   an odometry control arrangement provided in the mobile robot, the odometry control arrangement configured to control movement of the mobile robot in the work area based on the ground markers therein;
   an optical recognizer provided in the mobile robot, the optical recognizer configured to capture an image of a portion of the work area underneath the mobile robot when the mobile robot is operating in the work area;
   a respective grid defined for one or more of the ground markers from the matrix of ground markers in the work area, with each of the defined grids having the corresponding ground marker positioned inside thereof;
   a pattern formed in each of the defined grids in the work area, the pattern defines a plurality of vectors converging towards the corresponding ground marker positioned in the respective defined grid; and
   a processing unit configured to:
      receive the captured image from the optical recognizer;
      process the captured image to check if at least a section of the pattern is visible therein;
      process the captured image to determine one of the plurality of vectors visible in the section of the pattern, if the section of the pattern is visible in the captured image; and
      configure the odometry control arrangement to reorient the mobile robot to follow a path in a direction of the determined one of the plurality of vectors;
   wherein each of the defined grids has a closed loop shape, and wherein the corresponding ground marker is positioned at a geometric centre of the closed loop shape of the respective defined grid; and
   wherein the pattern comprises a predefined shape repeatedly printed in the respective grid and connecting along a plurality of virtual lines, with each of the plurality of virtual lines having a respective first end located at one of a plurality of distant points disposed along each edge of the respective defined grid and a respective second end located at a centre of the corresponding ground marker positioned in the respective defined grid, and with a size of the predefined shapes being continuously decreasing along the corresponding virtual line, and wherein each of the plurality of vectors defined in the pattern corresponds to one of the plurality of virtual lines in a direction from the respective first end to the respective second end thereof.

2. The system as claimed in claim 1, wherein the processing unit is configured to implement a feature extraction technique to determine the one of the plurality of vectors.

3. The system as claimed in claim 1, wherein optical recognizer comprises a camera.

4. The system as claimed in claim 1, wherein optical recognizer comprises a scanner.

5. The system as claimed in claim 1, wherein the processing unit comprises a processor.

6. The system as claimed in claim 1, wherein the odometry control arrangement comprises a processor.

7. A method for automatically correcting orientation of a mobile robot operating in a work area comprising a matrix of ground markers, the method comprising:
   defining a respective grid for one or more of the ground markers from the matrix of ground markers in the work area with each of the defined grids having the corresponding ground marker positioned inside thereof;
   providing a pattern in each of the defined grids in the work area, wherein the pattern defines a plurality of vectors converging towards the corresponding ground marker positioned in the respective grid;
   configuring an optical recognizer provided in the mobile robot to capture an image of a portion of the work area underneath the mobile robot when the mobile robot is operating in the work area;
   processing the captured image to check if at least a section of the pattern is visible therein;
   processing the captured image to determine one of the plurality of vectors visible in the section of the pattern, if the section of the pattern is visible in the captured image;
   configuring an odometry control arrangement to reorient the mobile robot to follow a path in a direction of the determined one of the plurality of vectors;
   wherein each of the defined grids has a closed loop shape, and wherein the corresponding ground marker is positioned at a geometric centre of the closed loop shape of the respective defined grid; and
   wherein defining the pattern comprises defining a predefined shape repeatedly printed in the respective grid and connecting along a plurality of virtual lines, with each of the plurality of virtual lines having a respective first end located at one of a plurality of distant points disposed along each edge of the respective defined grid and a respective second end located at a centre of the corresponding ground marker positioned in the respective defined grid, and with a size of the predefined shapes being continuously decreasing along the corresponding virtual line, and wherein each of the plurality of vectors defined in the pattern corresponds to one of the plurality of virtual lines in a direction from the respective first end to the respective second end thereof.

8. A system for automatically correcting orientation of a mobile robot operating in a work area comprising a matrix of ground markers, the system comprising:
   an odometry control arrangement provided in the mobile robot, the odometry control arrangement configured to control movement of the mobile robot in the work area based on the ground markers therein;
   an optical recognizer provided in the mobile robot, the optical recognizer configured to capture an image of a portion of the work area underneath the mobile robot when the mobile robot is operating in the work area;

a respective grid defined for one or more of the ground markers from the matrix of ground markers in the work area, with each of the defined grids having the corresponding ground marker positioned inside thereof;

a pattern formed in each of the defined grids in the work area, the pattern defines a plurality of vectors converging towards the corresponding ground marker positioned in the respective defined grid; and a processing unit configured to:
  receive the captured image from the optical recognizer;
  process the captured image to check if at least a section of the pattern is visible therein;
  process the captured image to determine one of the plurality of vectors visible in the section of the pattern, if the section of the pattern is visible in the captured image; and
  configure the odometry control arrangement to reorient the mobile robot to follow a path in a direction of the determined one of the plurality of vectors;

wherein each of the defined grids has a closed loop shape, and wherein the corresponding ground marker is positioned at a geometric centre of the closed loop shape of the respective defined grid, wherein the pattern comprises a plurality of concentric circles printed in the respective grid, with the circles in the plurality of concentric circles having a decreasing diameter moving from each edge of the respective defined grid towards a centre of the corresponding ground marker positioned in the respective defined grid, and wherein each of the plurality of vectors defined in the pattern corresponds to a perpendicular bisector of segments of the two or more circles of the plurality of concentric circles that are visible in the section of the pattern.

9. A method for automatically correcting orientation of a mobile robot operating in a work area comprising a matrix of ground markers, the method comprising:

defining a respective grid for one or more of the ground markers from the matrix of ground markers in the work area with each of the defined grids having the corresponding ground marker positioned inside thereof;

providing a pattern in each of the defined grids in the work area, wherein the pattern defines a plurality of vectors converging towards the corresponding ground marker positioned in the respective grid;

configuring an optical recognizer provided in the mobile robot to capture an image of a portion of the work area underneath the mobile robot when the mobile robot is operating in the work area;

processing the captured image to check if at least a section of the pattern is visible therein;

processing the captured image to determine one of the plurality of vectors visible in the section of the pattern, if the section of the pattern is visible in the captured image;

configuring an odometry control arrangement to reorient the mobile robot to follow a path in a direction of the determined one of the plurality of vectors; and wherein each of the defined grids has a closed loop shape, and wherein the corresponding ground marker is positioned at a geometric centre of the closed loop shape of the respective defined grid, wherein defining the pattern comprises defining a plurality of concentric circles printed in the respective grid, with the circles in the plurality of concentric circles having a decreasing diameter moving from each edge of the respective defined grid towards a centre of the corresponding ground marker positioned in the respective defined grid, and wherein each of the plurality of vectors defined in the pattern corresponds to a perpendicular bisector of segments of the two or more circles of the plurality of concentric circles that are visible in the section of the pattern.

* * * * *